July 13, 1948.  T. R. SMITH  2,445,247
SHAFT SEAL
Filed Aug. 23, 1946

INVENTOR.
Thomas R. Smith
BY
Atty.

Patented July 13, 1948

2,445,247

UNITED STATES PATENT OFFICE 2,445,247

SHAFT SEAL

Thomas R. Smith, Newton, Iowa, assignor to The Maytag Company, Newton, Iowa, a corporation of Delaware Application August 23, 1946, Serial No. 692,557

3 Claims. (Cl. 286—11.15)

The present invention relates to a seal for a rotating or oscillating shaft and more particularly to a novel shaft seal assembly in which the sealing element is maintained in continuous sealing contact with the shaft and the interior of the housing in which the shaft is journalled.

Among the advantages and objects of the present invention is the provision of a novel shaft seal in the form of an annular resilient collar seating upon the shaft and so constructed and arranged as to be maintained by spring pressure in sealing contact with the surface surrounding the shaft.

The invention further comprehends a novel seal assembly including a sealing element mounted upon and movable with the shaft and means for continuously forcing the sealing element against a face on a surface to be sealed to thereby compensate for any wear on the sealing element.

A further object of the present invention is to provide a novel shaft seal especially adapted for mounting upon a shaft adjacent the bearing in a housing and maintained in continuous sealing contact with the shaft and a surface on the bearing encompassing the shaft opening, the seal being so constructed, designed and arranged as to be self-sealing under pressure. Another feature of this novel seal assembly is that it permits a limited reciprocation of the rotating or oscillating shaft on which it is mounted wtihout affecting its sealing action.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

Figure 1:
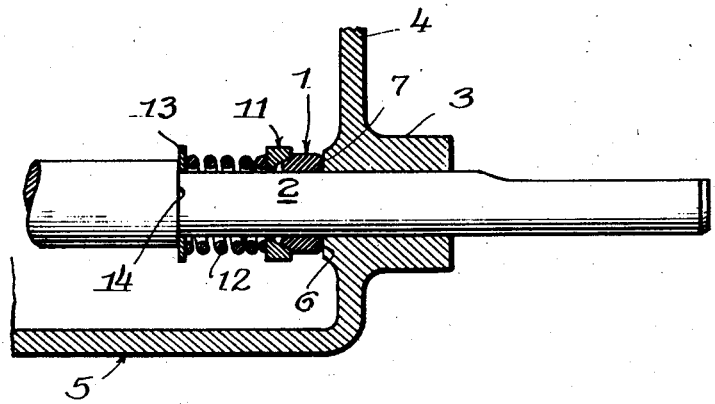
Figure 1 is a fragmentary view in vertical cross-section through the novel seal assembly mounted upon a rotatable or oscillatory shaft and adjacent the shaft bearing in an encompassing housing.
Figure 2:
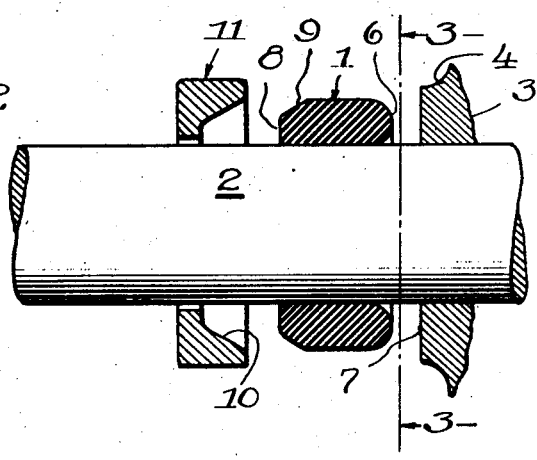
Fig. 2 is an enlarged, disassembled view of the novel sealing element and associated collar disposed upon the shaft.
Figure 3:
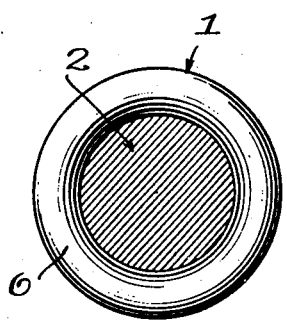
Fig. 3 is a view in vertical cross-section taken on the line 3—3 of Fig. 2 and showing the sealing element in end elevation.

Referring specifically to the construction disclosed in Figs. 1, 2 and 3 of the drawing, the novel embodiment therein selected to illustrate the invention comprises an annular sealing element or ring 1 formed of a resilient material, preferably of natural or compounded synthetic rubber having the necessary degree of flexibility, long life and resistance to wear and deterioration under any and all conditions to which it is subjected in use. This annular sealing element is mounted upon and encompasses a shaft 2 journalled in a bearing 3 formed or provided in a wall 4 of a housing 5.

The normal inside diameter of the sealing ring is preferably somewhat less than the diameter of the shaft over which it is fitted so as to hug the shaft and effect and maintain a sealing contact therewith to thereby prevent leakage along the shaft. The sealing face 6 of the ring 1 is preferably rounded and adapted to maintain a sealing contact with the smooth annular surface 7 surrounding the opening in the bearing in the housing 5 through which the shaft 2 passes. The opposite face 8 of the sealing element is provided with a beveled or conical surface 9 conforming to the conical surface 10 on the interior of a collar 11 loosely encompassing the shaft and adapted to be pressed or forced against the complementary surface on the sealing element.

A coil spring 12 is disposed about the shaft and seats at one end against the collar 11 and at its other end against a washer 13 encompassing the shaft and abutting against a shoulder or stepped enlargement 14 on the shaft. Thus the spring presses against the collar 11 which in turn presses against the face or end 8 and beveled surface 9 of the resilient sealing element to thereby apply an endwise thrust which not only maintains the seal against the sealing surface 7 but also retains and causes the sealing element to more tightly grip the outside surface or circumference of the shaft 2.

Figure 4:
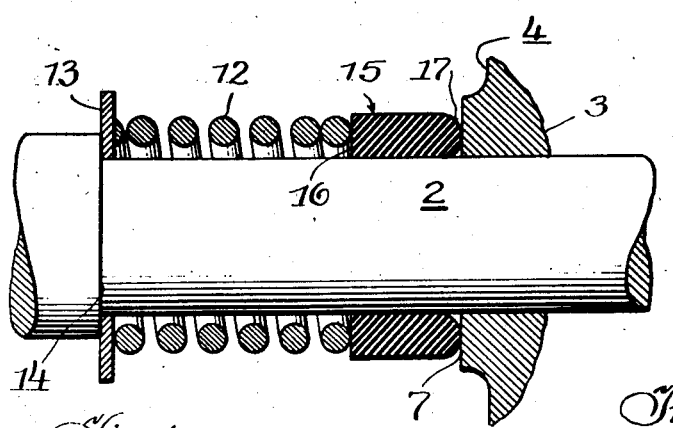
Fig. 4 is an enlarged fragmentary view in vertical cross-section of an alternate construction of seal assembly.

In Fig. 4 is disclosed an alternate or modified construction of seal assembly including an annular, resilient sealing element or ring 15 and in which assembly the coil spring or pressure-exerting means 12 seats against a flat face 16 on the sealing element, the opposite sealing face 17 being preferably rounded and maintained in continuous sealing contact with the smooth, annular seating surface 7 encompassing or surrounding the shaft. As in the embodiment shown in Fig. 1, the normal internal diameter of the annular, resilient collar 15 is somewhat less than the outer diameter of the shaft 2 so as to tightly hug the shaft and maintain optimum sealing contact therewith.

Although sealing contact is maintained with the shaft 2 for the reason that the resilient collar or sealing element is constructed upon the shaft in both embodiments of the invention, the spring is so constructed and designed and of such strength as to force the sealing element endwise along the shaft and maintain it at all times and under all conditions of operation against the annular face or seating surface 7 machined about the opening in the housing. In other words, the fit between the coacting surfaces on the shaft and sealing ring is such as to prevent leakage but is not sufficiently tight to prevent the spring from maintaining sealing contact between the sealing ring and the adjacent surface 7 on the housing. If the pressure within the housing increases, its effect is to maintain and increase the sealing contact whereby a self-sealing effect is obtained. Although the shaft 2 may be rotated or oscillated, by reason of the novel seal assembly with the spring acting upon the annular, resilient sealing element forcing and maintaining it in sealing contact with both the shaft and housing, this shaft may have limited reciprocatory movement longitudinally in either direction and still maintain effective sealing at all times. As the shaft rotates, the spring 12, washer 13, collar 11 and sealing element 1 or 15, all rotate or move with the shaft.

Having thus disclosed the invention, I claim:

1. A seal assembly adapted to rotate or oscillate with and encompassing a shaft extending through a wall separating regions of different pressures, comprising an annular, resilient sealing ring mounted upon and rotatable with the shaft on the pressure side of the wall, said sealing ring having an initially smaller bore than the diameter of the shaft and being unconfined on its outer periphery and of substantially cylindrical form having an axial length greater than its thickness, one face of the sealing ring contacting the adjacent surface on the wall, and spring-actuated means for applying pressure to the other end of the sealing ring for maintaining the ring in sealing engagement with the shaft and wall.

2. A seal assembly adapted to rotate or oscillate with and encompassing a shaft extending through a wall separating regions of different pressures, comprising a resilient sealing ring mounted upon and rotatable with the shaft on the pressure side of and adjacent the wall, said sealing ring being of substantially cylindrical form having an initially smaller bore than the diameter of the shaft and being unconfined on its outer periphery, one face of the sealing ring contacting the adjacent surface on the wall, a collar slidable on the shaft abutting the other end of the sealing ring, an abutment on the shaft, and a coil spring disposed between the abutment and collar and acting against the collar for forcing the sealing ring into sealing contact with the shaft and adjacent surface on the wall.

3. A shaft seal assembly encompassing a shaft extending through a wall separating regions of different pressures and adapted to rotate or oscillate with the shaft, comprising an annular, resilient sealing ring mounted upon the shaft on the pressure side and having an initially smaller bore than the diameter of the shaft whereby it rotates with the shaft and seals thereagainst, said sealing ring being of cylindrical form and unconfined on its outer periphery with one end of the sealing ring being rounded and contacting the adjacent surface on the wall, and spring-actuated means for applying pressure to the other end of the sealing ring for maintaining the ring in sealing engagement with the shaft and wall.

THOMAS R. SMITH.

REFERENCES CITED

The following references are of record in the file of this patent:

UNITED STATES PATENTS

| Number | Name | Date |
|---|---|---|
| 817,898 | Benjamin | Apr. 17, 1906 |
| 1,926,006 | Kohler | Sept. 5, 1933 |

Certificate of Correction

July 13, 1948.

Patent No. 2,445,247.

THOMAS R. SMITH

It is hereby certified that error appears in the printed specification of the above numbered patent requiring correction as follows: Column 3, line 13, for the word "constructed" read *constricted*; and that the said Letters Patent should be read with this correction therein that the same may conform to the record of the case in the Patent Office.

Signed and sealed this 14th day of September, A. D. 1948.

[SEAL]

THOMAS F. MURPHY,
*Assistant Commissioner of Patents.*